(12) United States Patent
Makita et al.

(10) Patent No.: US 9,266,988 B2
(45) Date of Patent: Feb. 23, 2016

(54) FUMARIC ACID DIESTER BASED RESIN FOR RETARDATION FILM AND RETARDATION FILM COMPRISING THE SAME

(75) Inventors: Kenichi Makita, Mie (JP); Shinji Shimosato, Mie (JP); Shinsuke Toyomasu, Mie (JP); Tohru Doi, Mie (JP)

(73) Assignee: TOSOH CORPORATION, Shunan-shi (JP)

( * ) Notice: Subject to any disclaimer, the term of this patent is extended or adjusted under 35 U.S.C. 154(b) by 240 days.

(21) Appl. No.: 13/807,106

(22) PCT Filed: Jun. 24, 2011

(86) PCT No.: PCT/JP2011/064508
§ 371 (c)(1),
(2), (4) Date: Dec. 27, 2012

(87) PCT Pub. No.: WO2012/005120
PCT Pub. Date: Jan. 12, 2012

(65) Prior Publication Data
US 2013/0102751 A1    Apr. 25, 2013

(30) Foreign Application Priority Data
Jul. 6, 2010 (JP) .................................. 2010-154156

(51) Int. Cl.
| | | |
|---|---|---|
| C08F 222/10 | (2006.01) | |
| C08F 222/00 | (2006.01) | |
| C08F 222/14 | (2006.01) | |
| G02B 1/04 | (2006.01) | |
| G02F 1/13363 | (2006.01) | |
| G02B 5/30 | (2006.01) | |

(52) U.S. Cl.
CPC ............ *C08F 222/10* (2013.01); *G02B 5/3016* (2013.01); *G02B 5/3083* (2013.01); *G02F 1/133634* (2013.01)

(58) Field of Classification Search
CPC .... C08F 222/04; C08F 222/10; C08F 222/28; G02B 5/3016; G02B 5/3083; G02F 1/133634
See application file for complete search history.

(56) References Cited

U.S. PATENT DOCUMENTS

| | | | | |
|---|---|---|---|---|
| 4,868,260 A | * | 9/1989 | Kawaguchi | ........... C08F 222/10 526/242 |
| 5,051,488 A | * | 9/1991 | Fujio | ..................... C08F 218/18 526/322 |
| 2007/0298247 A1 | | 12/2007 | Makita et al. | |
| 2008/0068545 A1 | * | 3/2008 | Doi et al. | ........................ 349/118 |

FOREIGN PATENT DOCUMENTS

| | | |
|---|---|---|
| JP | S58-201814 A | 11/1983 |
| JP | S62-072706 A | 4/1987 |
| JP | 5-297223 A | 11/1993 |
| JP | 5-323120 A | 12/1993 |
| JP | 6-88909 A | 3/1994 |
| JP | 2818983 B2 | 8/1998 |
| JP | 2005-156862 A | 6/2005 |
| JP | 2006-162748 A | 6/2006 |
| JP | 2006-249318 A | 9/2006 |
| JP | 2008-064817 A | 3/2008 |
| JP | 2008-112141 A | 5/2008 |
| JP | 2008-120851 A | 5/2008 |
| JP | 2008120851 A * | 5/2008 |
| JP | 2008-129465 A | 6/2008 |
| JP | 2009-168900 A | 7/2009 |
| JP | 2011-107281 A | 6/2011 |
| JP | 2012-132945 A | 7/2012 |
| TW | 200821351 A | 5/2008 |

OTHER PUBLICATIONS

English translation of JP 2008-120851 A; Fujii et al; May 2008.*
International Search Report and Written Opinion of the International Searching Authority Issued Sep. 27, 2011 in PCT/JP2011/064508 (with English translation).
Office Action issued Feb. 17, 2015, in Japanese Patent Application No. 2011-131459 filed Jun. 13, 2011 (w/ English translation).
Taiwanese Office Action dated Nov. 10, 2015, in Taiwanese Patent Application No. 100122860 with English Translation (10 pages).

* cited by examiner

*Primary Examiner* — Karuna P Reddy
(74) *Attorney, Agent, or Firm* — Oblon, McClelland, Maier & Neustadt, L.L.P.

(57) ABSTRACT

A fumaric acid diester based resin containing a dipropyl fumarate residue unit and a fumaric acid diester residue unit having a C1 or C2 alkyl group, wherein in a retardation film composed of the resin, when a refractive index in the fast axis direction within the film plane is designated as nx, a refractive index in the film in-plane direction orthogonal thereto is designated as ny, and a refractive index in the thickness direction of the film is designated as nz, the respective refractive indices are satisfied with a relationship of ($nx \leq ny < nz$) and a relationship between a film thickness and an out-of-plane retardation measured at a wavelength of 550 nm and expressed by the specific equation is 4.5 nm/film thickness ($\mu$m) or more in terms of an absolute value.

11 Claims, 1 Drawing Sheet

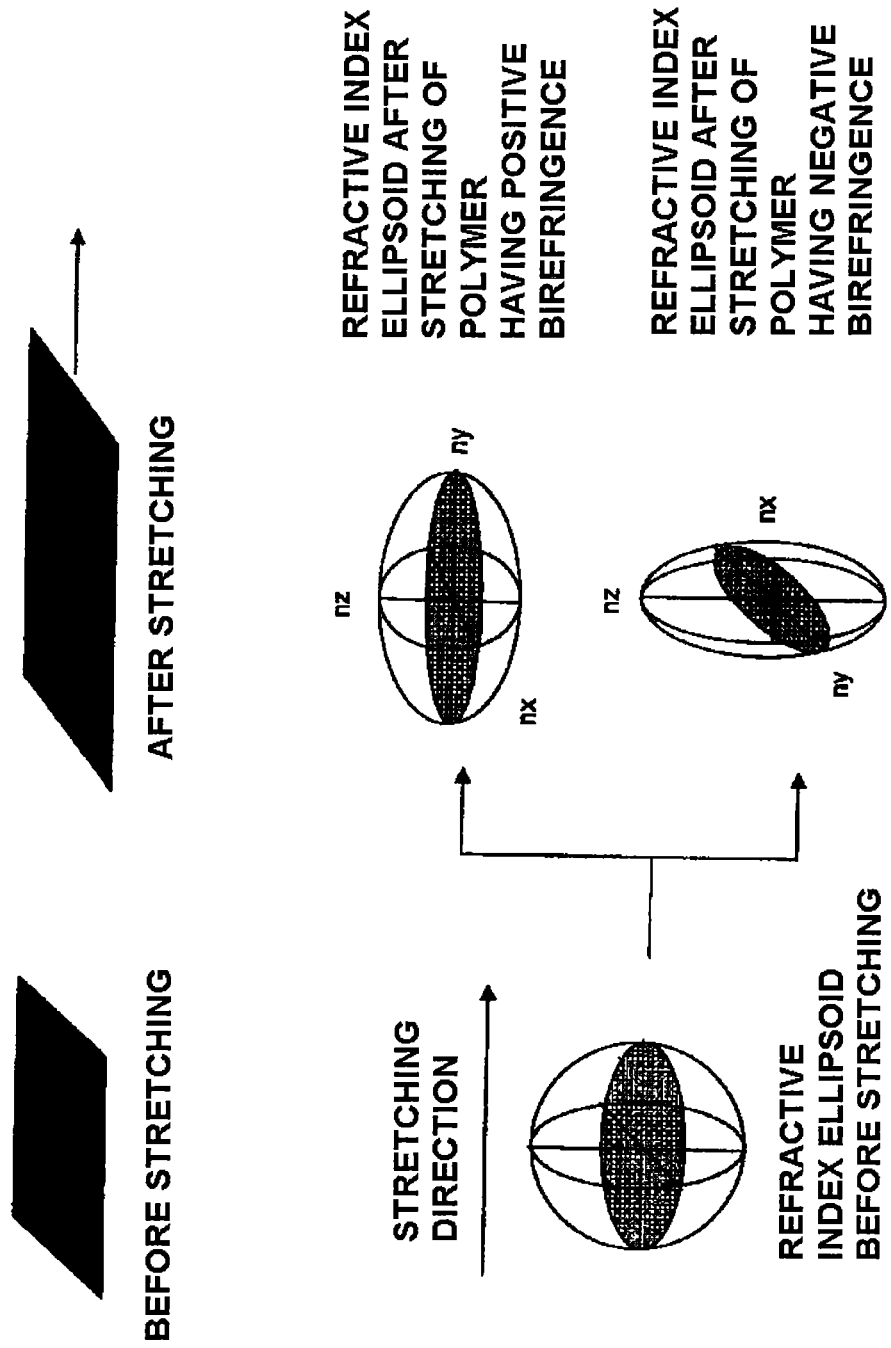

FUMARIC ACID DIESTER BASED RESIN FOR RETARDATION FILM AND RETARDATION FILM COMPRISING THE SAME

TECHNICAL FIELD

The present invention relates to a fumaric acid diester based resin suitable for a retardation film having excellent optical characteristics, including a high out-of-plane retardation even in a thin film, wavelength dependency, and the like, and to a retardation film comprising the same. In particular, the present invention relates to a fumaric acid diester based resin suitable for a retardation film for liquid crystal display element and to a retardation film comprising the same.

BACKGROUND ART

Liquid crystal displays are used as a display device which is the most important in the multimedia society in a wide range inclusive of from mobile phones to monitors for computer, monitors for laptop computer, and television receivers. For the liquid crystal displays, a lot of optical films for enhancing display characteristics are used. In particular, retardation films play a large role for enhancement of a contrast in the case of being viewed from the front or oblique direction, compensation of a color tone, or the like. In conventional retardation films, polycarbonates or cyclic polyolefins are used, and all of these polymers are a polymer having positive birefringence. Here, the terms "positive" and "negative" of birefringence are defined as follows.

The optical anisotropy of a polymer film having been subjected to molecular orientation by means of stretching or the like can be expressed by a refractive index ellipsoid shown in FIG. 1. Here, in the case of stretching a film, a refractive index in the fast axis direction within the film plane is designated as nx, a refractive index in the film in-plane direction orthogonal thereto is designated as ny, and a refractive index in the thickness direction of the film is designated as nz. Incidentally, the fast axis as referred to herein means an axis direction with a low refractive index within the film plane.

Then, the "negative birefringence" as referred to herein means that the stretching direction is the fast axis direction, and the "positive birefringence" as referred to herein means that a direction vertical to the stretching direction is the fast axis direction.

Namely, in uniaxial stretching of a polymer having negative birefringence, the refractive index in the stretching axis direction is small (fast axis: stretching direction), and in uniaxial stretching of a polymer having positive birefringence, the refractive index in the orthogonal axis direction to the stretching axis is small (fast axis: vertical direction to the stretching direction).

A lot of polymers have positive birefringence. While examples of a polymer having negative birefringence include an acrylic resin and polystyrene, the acrylic resin is small in retardation and insufficient in characteristics as a retardation film. The polystyrene involves a problem regarding stability of retardation such that because of a large photoelastic coefficient in a low temperature region, the retardation is changed by even a few stress; a problem in optical characteristics such that wavelength dependency of the retardation is large; and moreover, a problem in view of practical use such that heat resistance is low, and hence, the polystyrene is not used at present.

The wavelength dependency of the retardation as referred to herein means that the retardation changes depending upon the measuring wavelength and can be expressed as a ratio (R450/R550) between a retardation measured at a wavelength of 450 nm (R450) and a retardation measured at a wavelength of 550 nm (R550). In general, in polymers of an aromatic structure, a tendency that this (R450/R550) becomes large is strong, and a contrast or viewing angle characteristic in a short-wavelength region is lowered.

In stretched films of a polymer exhibiting negative birefringence, the refractive index in the thickness direction of the film is high, and a retardation film which has not been found so far is produced. Therefore, for example, such stretched films are useful as a retardation film for compensation of the viewing angle characteristic of a display such as a supertwisted nematic type liquid crystal display (STN-LCD), a vertical alignment type liquid crystal display (VA-LCD), an in-plane switching type liquid crystal display (IPS-LCD), a reflection type liquid crystal display (reflection type LCD), etc., or a viewing angle compensation film of a polarizing plate, and requirements of the marketplace for retardation films having negative birefringence are strong.

On the other hand, there are proposed manufacturing methods of a film with an increased refractive index in the thickness direction of the film using a polymer having positive birefringence. One of them is a treatment method in which a heat-shrinkable film is adhered onto one or both surfaces of the polymer film, the resulting laminate is subjected to a heat-stretching treatment, and a shrinkage force is applied in the film thickness direction of the polymer film (see, for example, Patent Documents 1 to 3). In addition, there is proposed a method in which a polymer film is uniaxially stretched within the plane while impressing an electric field thereto (see, for example, Patent Document 4).

Besides, there is proposed a retardation film composed of fine particles having negative optical anisotropy and a transparent polymer (see, for example, Patent Document 5).

But, the methods proposed in Patent Documents 1 to 4 involve such a problem that productivity is inferior because the manufacturing step is very complicated. In addition, control of uniformity of the retardation, or the like is remarkably difficult as compared with the conventional control by stretching.

In the case of using a polycarbonate as a base film, a photoelastic coefficient at room temperature is large, and the retardation is changed even by a few stress, so that there is involved a problem regarding stability of retardation. Furthermore, there is involved such a problem that the wavelength dependency of the retardation is large.

The retardation film obtained in Patent Document 5 is a retardation film exhibiting negative birefringence by the addition of fine particles having negative optical anisotropy, and from the viewpoints of simplification and economy of the manufacturing method, a retardation film which does not require the addition of fine particles is demanded.

In addition, there is proposed a film composed of a fumaric acid diester based resin (see, for example, Patent Document 6). While the optically compensatory film obtained in Patent Document 6 has an out-of-plane retardation to some extent, a film having a high out-of-plane retardation even in a thin film is demanded.

Patent Document 7 discloses a fumaric acid diester copolymer having a storage elastic modulus (E'), as determined by the dynamic viscoelasticity measurement at 200° C. at a frequency of 10 Hz, of $2.0 \times 10^7$ Pa or more and exemplifies a copolymer of diisopropyl fumarate and di-n-butyl fumarate or bis(2-ethylhexyl) fumarate. Patent Document 7 is a patent application which is concerned with a fumaric acid diester copolymer having excellent transparency, heat resistance and mechanical characteristics and an optical film composed of the subject copolymer, in particular a plastic film substrate. However, Patent Document 7 does not provide a description regarding the retardation, and a resin with higher retardation revelation properties is demanded as the resin for retardation film.

PRIOR ART DOCUMENTS

Patent Documents

Patent Document 1: Japanese Patent No. 2818983
Patent Document 2: JP-A-5-297223
Patent Document 3: JP-A-5-323120
Patent Document 4: JP-A-6-88909
Patent Document 5: JP-A-2005-156862
Patent Document 6: JP-A-2008-112141
Patent Document 7: JP-A-2008-120851

SUMMARY OF THE INVENTION

Problems to be Solved by the Invention

An object of the present invention is to provide a fumaric acid diester based resin suitable for a retardation film, which is composed of a specified resin and which has excellent optical characteristics, including a high out-of-plane retardation even in a thin film, wavelength dependency, and the like, and heat resistance, and a retardation film comprising the same.

Means for Solving the Problems

In order to solve the foregoing problems, the present inventors made extensive and intensive investigations. As a result, it has been found that a specified fumaric acid diester based resin is able to solve the foregoing problems, leading to accomplishment of the present invention.

Specifically, the present invention is concerned with a fumaric acid diester based resin for retardation film containing a diisopropyl fumarate residue unit and a fumaric acid diester residue unit having an alkyl group having a carbon number of 1 or 2, characterized in that in a retardation film composed of the subject fumaric acid diester based resin for retardation film, when a refractive index in the fast axis direction within the film plane is designated as nx, a refractive index in the film in-plane direction orthogonal thereto is designated as ny, and a refractive index in the thickness direction of the film is designated as nz, the respective refractive indices are satisfied with a relationship of (nx≤ny<nz); and that a relationship between a film thickness and an out-of-plane retardation (Rth) measured at a wavelength of 550 nm and expressed by a prescribed equation is 4.5 nm/film thickness (μm) or more in terms of an absolute value; and a retardation film comprising the same.

That is, the gist of the present invention resides in the following (1) to (6).

(1) A fumaric acid diester based resin for retardation film containing a diisopropyl fumarate residue unit and a fumaric acid diester residue unit having an alkyl group having a carbon number of 1 or 2, characterized in that in a retardation film composed of the fumaric acid diester based resin for retardation film, when a refractive index in the fast axis direction within the film plane is designated as nx, a refractive index in the film in-plane direction orthogonal thereto is designated as ny, and a refractive index in the thickness direction of the film is designated as nz, the respective refractive indices are satisfied with a relationship of (nx≤ny<nz); and that a relationship between a film thickness and an out-of-plane retardation (Rth) measured at a wavelength of 550 nm and expressed by the following equation (a) is 4.5 nm/film thickness (μm) or more in terms of an absolute value.

$$Rth=((nx+ny)/2-nz)\times d \tag{a}$$

(Here, d represents a thickness of the film.)

(2) Preferably, the fumaric acid diester based resin for retardation film as set forth in (1), characterized in that the retardation film composed of the fumaric acid diester based resin for retardation film has an out-of-plane retardation (Rth) measured at a wavelength of 550 nm and expressed by the following equation (a) of from −50 to −2,000 nm.

$$Rth=((nx+ny)/2-nz)\times d \tag{a}$$

(Here, d represents a thickness of the film.)

(3) Preferably, the fumaric acid diester based resin for retardation film as set forth in (1) or (2), characterized by containing from 50 to 99% by mole of the diisopropyl fumarate residue unit and from 1 to 50% by mole of the fumaric acid diester residue unit having an alkyl group having a carbon number of 1 or 2.

(4) A retardation film comprising the fumaric acid diester based resin for retardation film as set forth in any one of (1) to (3), characterized in that when a refractive index in the fast axis direction within the film plane is designated as nx, a refractive index in the film in-plane direction orthogonal thereto is designated as ny, and a refractive index in the thickness direction of the film is designated as nz, the respective refractive indices are satisfied with a relationship of (nx≤ny<nz); and that a relationship between a film thickness and an out-of-plane retardation (Rth) measured at a wavelength of 550 nm and expressed by the following equation (a) is 4.5 nm/film thickness (μm) or more in terms of an absolute value.

$$Rth=((nx+ny)/2-nz)\times d \tag{a}$$

(Here, d represents a thickness of the film.)

(5) Preferably, the retardation film as set forth in (4), characterized in that an out-of-plane retardation (Rth) measured at a wavelength of 550 nm and expressed by the following equation (a) is from −50 to −2,000 nm.

$$Rth=((nx+ny)/2-nz)\times d \tag{a}$$

(Here, d represents a thickness of the film.)

(6) Preferably, the retardation film as set forth in (4) or (5), characterized in that a ratio (R450/R550) between a retardation measured at a wavelength of 450 nm (R450) and a retardation measured at a wavelength of 550 nm (R550) is not more than 1.1.

Effects of the Invention

The fumaric acid diester based resin for retardation film according to the present invention is a fumaric acid diester based resin suitable for a retardation film, which has excellent optical characteristics, including a high out-of-plane retardation even in a thin film, a large refractive index in the thickness direction of a film, small wavelength dependency, and the like, and in particular, it is suitable for a retardation film for liquid crystal display element.

BRIEF DESCRIPTION OF THE DRAWING

FIG. 1 is a drawing showing a change of a refractive index ellipsoid by stretching.

MODES FOR CARRYING OUT THE INVENTION

The present invention is hereunder described in detail.

The fumaric acid diester based resin for retardation film according to the present invention is a fumaric acid diester based resin containing a diisopropyl fumarate residue unit and a fumaric acid diester residue unit having an alkyl group having a carbon number of 1 or 2.

Here, the alkyl groups having a carbon number of 1 or 2 in the fumaric acid diester residue unit having an alkyl group having a carbon number of 1 or 2 are independent upon each other, and examples thereof include a methyl group and an ethyl group. In addition, these may be substituted with a halogen group such as fluorine, chlorine, etc.; an ether group; or an ester group or an amino group. Examples of the fumaric acid diester residue unit having an alkyl group having a carbon number of 1 or 2 include a dimethyl fumarate residue unit and a diethyl fumarate residue unit. In addition, one kind or two or more kinds of them may be contained.

Specifically, examples of the fumaric acid diester based resin for retardation film according to the present invention include a diisopropyl fumarate/dimethyl fumarate copolymer resin, a diisopropyl fumarate/diethyl fumarate copolymer resin, and the like.

The fumaric acid diester based resin may contain other monomer residue unit so far as the scope of the present invention is not deviated. As other monomer residue unit, for example, there can be exemplified one or two or more members selected among styrene residue units such as a styrene residue unit, an α-methylstyrene residue unit, etc.; a (meth) acrylic acid residue unit; (meth)acrylic acid ester residue units such as a methyl(meth)acrylate residue unit, an ethyl (meth)acrylate residue unit, a butyl(meth)acrylate residue unit, etc.; vinyl ester residue units such as a vinyl acetate residue unit, a vinyl propionate residue unit, etc.; an acrylonitrile residue unit; a methacrylonitrile residue unit; vinyl ether residue units such as a methyl vinyl ether residue unit, an ethyl vinyl ether residue unit, a butyl vinyl ether residue unit, etc.; N-substituted maleimide residue units such as an N-methylmaleimide residue unit, an N-cyclohexylmaleimide residue unit, an N-phenylmaleimide residue unit, etc.; olefin residue units such as an ethylene residue unit, a propylene residue unit, etc.; and fumaric acid diester residue units other than the above-described fumaric acid diester residue units, such as di-n-butyl fumarate residue unit, a bis(2-ethylhexyl) fumarate residue unit, etc.

A blending proportion of the monomer residue units in the fumaric acid diester based resin for retardation film according to the present invention is preferably from 50 to 99% by mole of the diisopropyl fumarate residue unit and from 1 to 50% by mole of the fumaric acid diester residue unit having an alkyl group having a carbon number of 1 or 2. A fumaric acid diester based resin comprising from 60 to 95% by mole of a diisopropyl fumarate residue unit and from 5 to 40% by mole of a fumaric acid diester residue unit having an alkyl group having a carbon number of 1 or 2 is especially preferable because when formed into a retardation film, excellent retardation characteristic and strength are revealed. A total sum of the blending proportions of the diisopropyl fumarate residue unit and the fumaric acid diester residue unit having an alkyl group having a carbon number of 1 or 2 is 100% by mole.

In the fumaric acid diester based resin for retardation film according to the present invention, a number average molecular weight as reduced into standard polystyrene, which is obtained from an elution curve measured by means of gel permeation chromatography (hereinafter referred to as "GPC"), is preferably from 50,000 to 250,000.

As for a manufacturing method of the fumaric acid diester based resin for retardation film according to the present invention, any method may be adopted so far as the fumaric acid diester based resin is obtained. For example, the fumaric acid diester based resin for retardation film can be manufactured by subjecting diisopropyl fumarate and a fumaric acid diester having an alkyl group having a carbon number of 1 or 2 to radical polymerization.

For the above-described radical polymerization, any known polymerization methods, for example, a block polymerization method, a solution polymerization method, a suspension polymerization method, a precipitation polymerization method, and an emulsion polymerization method can be adopted.

Examples of a polymerization initiator at the time of conducting the radical polymerization method include organic peroxides such as benzoyl peroxide, lauryl peroxide, octanoyl peroxide, acetyl peroxide, di-t-butyl peroxide, t-butylcumyl peroxide, dicumyl peroxide, t-butyl peroxyacetate, t-butyl peroxybenzoate, etc.; and azo based initiators such as 2,2'-azobis(2,4-dimethylvaleronitrile), 2,2'-azobis(2-butyronitrile), 2,2'-azobisisobutyronitrile, dimethyl-2,2'-azobisisobutyrate, 1,1'-azobis(cyclohexane-1-carbonitrile), etc.

A solvent which can be used for the solution polymerization method, suspension polymerization method, precipitation polymerization method, or emulsion polymerization method is not particularly limited, and examples thereof include aromatic solvents such as benzene, toluene, xylene, etc.; alcohol based solvents such as methanol, ethanol, propanol, butanol, etc.; cyclohexane; dioxane; tetrahydrofuran; acetone; methyl ethyl ketone; dimethylformamide; isopropyl acetate; water; and the like. Mixed solvents of these solvents are also exemplified.

A polymerization temperature at the time of conducting the radical polymerization can be properly set depending upon a decomposition temperature of the polymerization initiator, and in general, the radical polymerization is preferably conducted at a temperature ranging from 30 to 150° C.

When formed into an optical film, the fumaric acid diester based resin for retardation film according to the present invention is preferably formed into a retardation film because it has excellent optical characteristics, including a high out-of-plane retardation even in a thin film, wavelength dependency, and the like. Incidentally, the subject retardation film is a retardation film which does not require the addition of fine particles.

The retardation film according to the present invention is a retardation film which is characterized in that when a refractive index in the fast axis direction within the film plane is designated as nx, a refractive index in the film in-plane direction orthogonal thereto is designated as ny, and a refractive index in the thickness direction of the film is designated as nz, the respective refractive indices are satisfied with a relationship of ($nx \leq ny < nz$). By satisfying the relationship of ($nx \leq ny < nz$), a retardation film with excellent viewing angle compensation performance of STN-LCD, IPS-LCD, reflection type LCD, semi-transmission type LCD, or the like is produced. Incidentally, in general, the control of a three-dimensional refractive index of a film is conducted by means of stretching of the film or the like, and therefore, the manufacturing step or the management of quality becomes complicated. However, it has also been found that the retardation film according to the present invention exhibits such a specific behavior that it has a high refractive index in the film thickness direction in an unstretched state.

In view of the fact that the retardation film according to the present invention has a high out-of-plane retardation even in a thin film, a relationship between a film thickness and an out-of-plane retardation (Rth) measured at a wavelength of 550 nm and expressed by the following equation (a) is 4.5 nm/film thickness (μm) or more, and preferably from 5 to 15 nm/film thickness (μm) in terms of an absolute value.

$$Rth = ((nx+ny)/2 - nz) \times d \quad \text{(a)}$$

(Here, d represents a thickness of the film.)

When the relationship between a film thickness and an out-of-plane retardation (Rth) measured at a wavelength of 550 nm and expressed by the equation (a) is less than 4.5 nm/film thickness (μm) in terms of an absolute value, the film thickness becomes thick, so that the film is warped or causes unevenness.

In addition, in view of the fact that the retardation film according to the present invention becomes a retardation film with more excellent optical characteristics, the out-of-plane retardation (Rth) measured at a wavelength of 550 nm and expressed by the foregoing equation (a) is preferably from −50 to −2,000 nm, and especially preferably from −100 to −500 nm.

The wavelength dependency of the retardation can be expressed as a ratio (R450/R550) between a retardation measured at a wavelength of 450 nm (R450) and a retardation measured at a wavelength of 550 nm (R550), namely a ratio (R450/R550) of the retardation measured at a wavelength of 450 nm (R450) to the retardation measured at a wavelength of 550 nm (R550). In the retardation film according to the present invention, the subject (R450/R550) is preferably not more than 1.1, especially preferably not more than 1.08, and more preferably not more than 1.05 because of image quality of the display, in particular, a few change of color and an improvement of contrast.

In the retardation film according to the present invention, a light transmittance is preferably 85% or more, and especially preferably 90% or more because when used for a liquid crystal display element, characteristics of the image quality become favorable. In addition, a haze (degree of cloudiness) of the retardation film is preferably not more than 2%, and especially preferably not more than 1%.

A manufacturing method of the retardation film according to the present invention is not particularly limited, and for example, the retardation film according to the present invention can be manufactured by a method such as a solution casting method, a melt casting method, etc.

The solution casting method is a method in which a solution of a fumaric acid diester based resin dissolved in a solvent (the solution will be hereunder referred to as "dope") is cast onto a support substrate, and the solvent is then removed by means of heating or the like to obtain a film. On that occasion, as a method for casting the dope onto the support substrate, for example, a T die method, a doctor blade method, a bar coater method, a roll coater method, a lip coater method, or the like is adopted. In particular, from the industrial standpoint, a method for continuously extruding the dope from a die onto a support substrate in a belt form or drum form is the most general. Examples of the support substrate which is used include a glass substrate, a metal substrate such as stainless steel, ferrotype, etc., a film such as polyethylene terephthalate, etc., and the like. In the solution casting method, at the time of film formation of a film having high transparency and excellent thickness precision and surface smoothness, a solution viscosity of the dope is an extremely important factor, and it is preferably from 10 to 20,000 cPs, and especially preferably from 100 to 10,000 cPs.

On that occasion, a coating thickness of the fumaric acid diester based resin is preferably from 1 to 200 μm, more preferably from 5 to 100 μm, and especially preferably from 10 to 50 μm after drying.

In addition, the melt casting method is a molding method in which the fumaric acid diester based resin is melted within an extruder and extruded into a film form from slits of a T die, and the film is then taken over while cooling by rolls, air, or the like.

The retardation film according to the present invention can be used upon being separated from a glass substrate or other optical film as a base material and can also be used as a laminate with a glass substrate or other optical film as a base material.

In addition, the retardation film according to the present invention can be used as a circular or elliptical polarizing plate upon being laminated with a polarizing plate and can also be formed into a polarizing plate upon being laminated with a polarizer made of polyvinyl alcohol/iodine or the like. Furthermore, the retardation films according to the present invention can be laminated with each other, or the retardation film according to the present invention can be laminated with other retardation film.

In the retardation film according to the present invention, an antioxidant is preferably blended at the time of film molding or for the purpose of increasing heat stability of the retardation film itself. Examples of the antioxidant include hindered phenol based antioxidants, phosphorus based antioxidants, and other antioxidants. These antioxidants may be used solely or in combination. Then, in view of the fact that an antioxidant action is synergistically enhanced, a combined use of a hindered based antioxidant and a phosphorus based antioxidant is preferable. On that occasion, for example, it is especially preferable to use a mixture of from 100 to 500 parts by weight of the phosphorus based antioxidant based on 100 parts by weight of the hindered based antioxidant. In addition, an addition amount of the antioxidant is preferably from 0.01 to 10 parts by weight, and especially preferably from 0.5 to 1 part by weight based on 100 parts by weight of the fumaric acid diester based resin constituting the retardation film according to the present invention.

Furthermore, an ultraviolet ray absorber, for example, benzotriazole, benzophenone, triazine, benzoate, or the like may be blended as an ultraviolet ray absorber, if desired.

In the retardation film according to the present invention, other polymer, a surfactant, a polymer electrolyte, a conductive complex, an inorganic filler, a pigment, an antistatic agent, an anti-blocking agent, a lubricant, and the like may be blended within the range where the gist of the present invention is not deviated.

According to the present invention, it is possible to provide a fumaric acid diester based resin suitable for a retardation film, which is useful as a compensatory film for contrast or viewing angle characteristics of a liquid crystal display or an antireflection film, and which has excellent optical characteristics, including a large refractive index in the thickness direction of a film, a large out-of-plane retardation, small wavelength dependency, and the like.

That is, as described above, as for the fumaric acid diester based resin for retardation film according to the present invention, in a retardation film composed of the subject fumaric acid diester based resin for retardation film, when a refractive index in the fast axis direction within the film plane is designated as nx, a refractive index in the film in-plane direction orthogonal thereto is designated as ny, and a refractive index in the thickness direction of the film is designated as nz, the respective refractive indices are satisfied with a relationship of (nx≤ny<nz); and a relationship between a film thickness and an out-of-plane retardation (Rth) measured at a wavelength of 550 nm and expressed by the following equation (a) is 4.5 nm/film thickness (μm) or more in terms of an absolute value.

$$Rth=((nx+ny)/2-nz)\times d \quad (a)$$

(Here, d represents a thickness of the film.)

When the relationship between a film thickness and an out-of-plane retardation (Rth) measured at a wavelength of 550 nm and expressed by the equation (a) is less than 4.5 nm/film thickness (μm) in terms of an absolute value, the film thickness becomes thick, so that the film is warped or causes unevenness.

In addition, in view of the fact that in the fumaric acid diester based resin for retardation film according to the present invention, a retardation film composed of the subject fumaric acid diester based resin for retardation film becomes a retardation film with more excellent optical characteristics, the out-of-plane retardation (Rth) measured at a wavelength of 550 nm and expressed by the foregoing equation (a) is preferably from −50 to −2,000 nm, and especially preferably from −100 to −500 nm.

EXAMPLES

The present invention is hereunder described by reference to the following Examples, but it should not be construed that the present invention is limited to these Examples.

Incidentally, various physical properties shown by the Examples were measured in the following methods.

—Composition of Fumaric Acid Diester Based Resin—

The composition of the fumaric acid diester based resin was determined by proton nuclear magnetic resonance spectroscopy ($^1$H-NMR) spectral analysis using a nuclear magnetic resonance spectrometer (trade name: JNM-GX270, manufactured by JEOL Ltd.).

—Measurement of Number Average Molecular Weight—

The number average molecular weight was determined as a value obtained by conducting the measurement with tetrahydrofuran as a solvent at 40° C. using a gel permeation chromatograph (GPC) (trade name: CO-8011 (installed with a column GMHHR-H), manufactured by Tosoh Corporation), the value being reduced into standard polystyrene.

—Evaluation Method of Transparency—

Total forward transmission and haze of the film were measured using a haze meter (trade name: NDH5000, manufactured by Nippon Denshoku Industries Co., Ltd.).

—Measurement of Refractive Index—

The refractive index was measured using an Abbe's refractometer (manufactured by Atago Co., Ltd.) in conformity with JIS K7142 (1981).

—Measurement of Retardation and Three-Dimensional Refractive Index of Film—

The retardation and the three-dimensional refractive index were measured using an automatic birefringence analyzer (trade name: KOBRA-WR, manufactured by Oji Scientific Instruments).

Example 1

Synthesis of Fumaric Acid Diester Based Resin
(Diisopropyl Fumarate/Diethyl Fumarate Copolymer Resin)

A one-liter autoclave equipped with a stirrer, a cooling tube, a nitrogen introducing tube, and a thermometer was charged with 2 g of hydroxypropyl methyl cellulose (trade name: Metolose 60SH-50, manufactured by Shin-Etsu Chemical Co., Ltd.), 600 g of distilled water, 365 g of diisopropyl fumarate, 35 g of diethyl fumarate, and 3 g of t-butyl peroxypivalate as a polymerization initiator, and the contents were subjected to nitrogen bubbling for one hour and then kept at 45° C. for 24 hours while stirring at 400 rpm, thereby conducting radical suspension polymerization. After cooling to room temperature, a formed polymer particle-containing suspension liquid was separated by means of filtration and washed with distilled water and methanol, thereby obtaining a fumaric acid diester based resin (yield: 65%).

The obtained fumaric acid diester based resin had a number average molecular weight of 132,000. In addition, it was confirmed by $^1$H-NMR measurement that the resin had a composition of diisopropyl fumarate residue unit/diethyl fumarate residue unit of 91/9 (% by mole).

Example 2

Synthesis of Fumaric Acid Diester Based Resin
(Diisopropyl Fumarate/Diethyl Fumarate Copolymer Resin)

A one-liter autoclave equipped with a stirrer, a cooling tube, a nitrogen introducing tube, and a thermometer was charged with 2 g of hydroxypropyl methyl cellulose (trade name: Metolose 60SH-50, manufactured by Shin-Etsu Chemical Co., Ltd.), 600 g of distilled water, 330 g of diisopropyl fumarate, 70 g of diethyl fumarate, and 3 g of t-butyl peroxypivalate as a polymerization initiator, and the contents were subjected to nitrogen bubbling for one hour and then kept at 50° C. for 24 hours while stirring at 400 rpm, thereby conducting radical suspension polymerization. After cooling to room temperature, a formed polymer particle-containing suspension liquid was separated by means of filtration and washed with distilled water and methanol, thereby obtaining a fumaric acid diester based resin (yield: 75%).

The obtained fumaric acid diester based resin had a number average molecular weight of 120,000. In addition, it was confirmed by $^1$H-NMR measurement that the resin had a composition of diisopropyl fumarate residue unit/diethyl fumarate residue unit of 84/16 (% by mole).

Example 3

Synthesis of Fumaric Acid Diester Based Resin
(Diisopropyl Fumarate/Diethyl Fumarate Copolymer Resin)

A one-liter autoclave equipped with a stirrer, a cooling tube, a nitrogen introducing tube, and a thermometer was charged with 2 g of hydroxypropyl methyl cellulose (trade name: Metolose 60SH-50, manufactured by Shin-Etsu Chemical Co., Ltd.), 600 g of distilled water, 255 g of diisopropyl fumarate, 145 g of diethyl fumarate, and 3 g of t-butyl peroxypivalate as a polymerization initiator, and the contents were subjected to nitrogen bubbling for one hour and then kept at 45° C. for 36 hours while stirring at 400 rpm, thereby conducting radical suspension polymerization. After cooling to room temperature, a formed polymer particle-containing suspension liquid was separated by means of filtration and washed with distilled water and methanol, thereby obtaining a fumaric acid diester based resin (yield: 60%).

The obtained fumaric acid diester based resin had a number average molecular weight of 100,000. In addition, it was confirmed by $^1$H-NMR measurement that the resin had a composition of diisopropyl fumarate residue unit/diethyl fumarate residue unit of 70/30 (% by mole).

Example 4

Synthesis of Fumaric Acid Diester Based Resin (Diisopropyl Fumarate/Dimethyl Fumarate Copolymer Resin)

A one-liter autoclave equipped with a stirrer, a cooling tube, a nitrogen introducing tube, and a thermometer was charged with 3 g of hydroxypropyl methyl cellulose (trade name: Metolose 60SH-50, manufactured by Shin-Etsu Chemical Co., Ltd.), 600 g of distilled water, 380 g of diisopropyl fumarate, 20 g of dimethyl fumarate, and 3 g of t-butyl peroxypivalate as a polymerization initiator, and the contents were subjected to nitrogen bubbling for one hour and then kept at 50° C. for 24 hours while stirring at 400 rpm, thereby conducting radical suspension polymerization. After cooling to room temperature, a formed polymer particle-containing suspension liquid was separated by means of filtration and washed with distilled water and methanol, thereby obtaining a fumaric acid diester based resin (yield: 76%).

The obtained fumaric acid diester based resin had a number average molecular weight of 120,000. In addition, it was confirmed by $^1$H-NMR measurement that the resin had a composition of diisopropyl fumarate residue unit/dimethyl fumarate residue unit of 94/6 (% by mole).

Synthesis Example 1

Synthesis of Fumaric Acid Diester Based Resin (Diisopropyl Fumarate/Di-N-Butyl Fumarate Copolymer Resin)

A one-liter autoclave equipped with a stirrer, a cooling tube, a nitrogen introducing tube, and a thermometer was charged with 1.6 g of hydroxypropyl methyl cellulose (trade name: Metolose 60SH-50, manufactured by Shin-Etsu Chemical Co., Ltd.), 520 g of distilled water, 230 g of diisopropyl fumarate, 50 g of di-n-butyl fumarate, and 2.1 g of t-butyl peroxypivalate as a polymerization initiator, and the contents were subjected to nitrogen bubbling for one hour and then kept at 50° C. for 24 hours while stirring at 400 rpm, thereby conducting radical suspension polymerization. After cooling to room temperature, a formed polymer particle-containing suspension liquid was separated by means of filtration and washed with distilled water and methanol, thereby obtaining a fumaric acid diester based resin (yield: 80%).

The obtained fumaric acid diester based resin had a number average molecular weight of 150,000. In addition, it was confirmed by $^1$H-NMR measurement that the resin had a composition of diisopropyl fumarate residue unit/di-n-butyl fumarate residue unit of 87/13 (% by mole).

Synthesis Example 2

Synthesis of Fumaric Acid Diester Based Resin (Diisopropyl Fumarate/Bis-2-Ethylhexyl Fumarate Copolymer Resin)

A one-liter autoclave equipped with a stirrer, a cooling tube, a nitrogen introducing tube, and a thermometer was charged with 1.6 g of hydroxypropyl methyl cellulose (trade name: Metolose 60SH-50, manufactured by Shin-Etsu Chemical Co., Ltd.), 520 g of distilled water, 196 g of diisopropyl fumarate, 84 g of bis-2-ethylhexyl fumarate, and 1.9 g of t-butyl peroxypivalate as a polymerization initiator, and the contents were subjected to nitrogen bubbling for one hour and then kept at 50° C. for 24 hours while stirring at 400 rpm, thereby conducting radical suspension polymerization. After cooling to room temperature, a formed polymer particle-containing suspension liquid was separated by means of filtration and washed with distilled water and methanol, thereby obtaining a fumaric acid diester based resin (yield: 66%).

The obtained fumaric acid diester based resin had a number average molecular weight of 86,000. In addition, it was confirmed by $^1$H-NMR measurement that the resin had a composition of diisopropyl fumarate residue unit/bis-2-ethylhexyl fumarate residue unit of 84/16 (% by mole).

Synthesis Example 3

Synthesis of Fumaric Acid Diester Based Resin (Diisopropyl Fumarate Homopolymer Resin)

A one-liter autoclave equipped with a stirrer, a cooling tube, a nitrogen introducing tube, and a thermometer was charged with 1.6 g of hydroxypropyl methyl cellulose (trade name: Metolose 60SH-50, manufactured by Shin-Etsu Chemical Co., Ltd.), 520 g of distilled water, 280 g of diisopropyl fumarate, and 2 g of t-butyl peroxypivalate as a polymerization initiator, and the contents were subjected to nitrogen bubbling for one hour and then kept at 50° C. for 24 hours while stirring at 400 rpm, thereby conducting radical suspension polymerization. After cooling to room temperature, a formed polymer particle-containing suspension liquid was separated by means of filtration and washed with distilled water and methanol, thereby obtaining a fumaric acid diester based resin (yield: 75%).

The obtained diisopropyl fumarate homopolymer had a number average molecular weight of 120,000.

Example 5

The fumaric acid diester based resin obtained in Example 1 was dissolved in methyl isobutyl ketone to prepare a 15% weight resin solution, which was then cast onto a polyethylene terephthalate film by a coater, followed by drying at 130° C. for 10 minutes. There was thus obtained a 30 µm-thick film made of a fumaric acid diester based resin.

The obtained film had a total forward transmission of 92%, a haze of 0.6%, and a refractive index of 1.469.

A three-dimensional refractive index was nx=1.4672, ny=1.4672, and nz=1.4726, and the obtained film exhibited a large refractive index in the thickness direction of the film as (nx=ny<nz). In addition, an out-of-plane retardation Rth was large as −162 nm, and a ratio of retardations (R450/R550) (wavelength dependency) was a small value as 1.01. In addition, an absolute value between the film thickness and the out-of-plane retardation was 5.4.

From these results, the obtained film was suitable for a retardation film because it had negative birefringence, a large refractive index in the thickness direction, a large out-of-plane retardation, small wavelength dependency, and a high out-of-plane retardation even in a thin film.

Example 6

The fumaric acid diester based resin obtained in Example 2 was dissolved in methyl isobutyl ketone to prepare a 15% weight resin solution, which was then cast onto a polyethylene terephthalate film by a coater, followed by drying at 130°

C. for 10 minutes. There was thus obtained a 30 μm-thick film made of a fumaric acid diester based resin.

The obtained film had a total forward transmission of 93%, a haze of 0.6%, and a refractive index of 1.470.

A three-dimensional refractive index was nx=1.4683, ny=1.4683, and nz=1.4735, and the obtained film exhibited a large refractive index in the thickness direction of the film as (nx=ny<nz). In addition, an out-of-plane retardation was large as −156 nm, and a ratio of retardations (R450/R550) (wavelength dependency) was a small value as 1.01. In addition, an absolute value between the film thickness and the out-of-plane retardation was 5.2.

From these results, the obtained film was suitable for a retardation film because it had negative birefringence, a large refractive index in the thickness direction, a large out-of-plane retardation, small wavelength dependency, and a high out-of-plane retardation even in a thin film.

Example 7

The fumaric acid diester based resin obtained in Example 3 was dissolved in methyl acetate/methyl isobutyl ketone mixed solvent to prepare a 15% weight resin solution, which was then cast onto a polyethylene terephthalate film by a coater, followed by drying at 130° C. for 10 minutes. There was thus obtained a 30 μm-thick film made of a fumaric acid diester based resin.

The obtained film had a total forward transmission of 94%, a haze of 0.5%, and a refractive index of 1.472.

A three-dimensional refractive index was nx=1.4704, ny=1.4704, and nz=1.4752, and the obtained film exhibited a large refractive index in the thickness direction of the film as (nx=ny<nz). In addition, an out-of-plane retardation was large as −144 nm, and a ratio of retardations (R450/R550) (wavelength dependency) was a small value as 1.01. In addition, an absolute value between the film thickness and the out-of-plane retardation was 4.8.

From these results, the obtained film was suitable for a retardation film because it had negative birefringence, a large refractive index in the thickness direction, a large out-of-plane retardation, small wavelength dependency, and a high out-of-plane retardation even in a thin film.

Example 8

The fumaric acid diester based resin obtained in Example 4 was dissolved in methyl isobutyl ketone to prepare a 15% weight resin solution, which was then cast onto a polyethylene terephthalate film by a coater, followed by drying at 130° C. for 10 minutes. There was thus obtained a 30 μm-thick film made of a fumaric acid diester based resin.

The obtained film had a total forward transmission of 92%, a haze of 0.6%, and a refractive index of 1.468.

A three-dimensional refractive index was nx=1.4675, ny=1.4675, and nz=1.4726, and the obtained film exhibited a large refractive index in the thickness direction of the film as (nx=ny<nz). In addition, an out-of-plane retardation Rth was large as −153 nm, and a ratio of retardations (R450/R550) (wavelength dependency) was a small value as 1.01. In addition, an absolute value between the film thickness and the out-of-plane retardation was 5.1.

From these results, the obtained film was suitable for a retardation film because it had negative birefringence, a large refractive index in the thickness direction, a large out-of-plane retardation, small wavelength dependency, and a high out-of-plane retardation even in a thin film.

Comparative Example 1

The fumaric acid diester based resin obtained in Synthesis Example 1 was dissolved in a mixed solvent of toluene/methyl ethyl ketone (50/50) to prepare a 20% weight resin solution, which was then cast onto a polyethylene terephthalate film by a coater, followed by drying at 70° C. for 10 minutes. There was thus obtained a 30 μm-thick film.

The obtained film had a total forward transmission of 92%, a haze of 0.6%, and a refractive index of 1.472.

A three-dimensional refractive index was nx=1.4712, ny=1.4712, and nz=1.4743, and the obtained film exhibited a large refractive index in the thickness direction of the film as (nx=ny<nz). However, since the fumaric acid diester based resin containing a diisopropyl fumarate residue unit and a fumaric acid diester residue unit having an alkyl group having a carbon number of 1 or 2 was not used, the out-of-plane retardation was small as −93 nm, and an absolute value between the film thickness and the out-of-plane retardation was also small as 3.1.

Comparative Example 2

The fumaric acid diester based resin obtained in Synthesis Example 2 was dissolved in a mixed solvent of toluene/methyl ethyl ketone (50/50) to prepare a 20% weight resin solution, which was then cast onto a polyethylene terephthalate film by a coater, followed by drying at 70° C. for 10 minutes. There was thus obtained a 30 μm-thick film.

The obtained film had a total forward transmission of 92%, a haze of 0.6%, and a refractive index of 1.473.

A three-dimensional refractive index was nx=1.4723, ny=1.4723, and nz=1.4738, and the obtained film exhibited a large refractive index in the thickness direction of the film as (nx=ny<nz). However, since the fumaric acid diester based resin containing a diisopropyl fumarate residue unit and a fumaric acid diester residue unit having an alkyl group having a carbon number of 1 or 2 was not used, the out-of-plane retardation was small as −45 nm, and an absolute value between the film thickness and the out-of-plane retardation was also small as 1.5.

Comparative Example 3

The fumaric acid diester based resin obtained in Synthesis Example 3 was dissolved in tetrahydrofuran to prepare a 22% weight resin solution, which was then cast onto a polyethylene terephthalate film by a coater, followed by drying at 70° C. for 10 minutes. There was thus obtained a 21 μm-thick film.

The obtained film had a total forward transmission of 93%, a haze of 0.3%, and a refractive index of 1.468.

A three-dimensional refractive index was nx=1.4689, ny=1.4689, and nz=1.4723, and the obtained film exhibited a large refractive index in the thickness direction of the film as (nx=ny<nz). However, since the fumaric acid diester based resin containing a diisopropyl fumarate residue unit and a fumaric acid diester residue unit having an alkyl group having a carbon number of 1 or 2 was not used, the out-of-plane retardation was small as −71 nm, and an absolute value between the film thickness and the out-of-plane retardation was also small as 3.4.

While the invention has been described in detail and with reference to specific embodiments thereof, it will be apparent to one skilled in the art that various changes and modifications can be made therein without departing from the spirit and scope thereof.

This application is based on a Japanese patent application filed on Jul. 6, 2010 (Application No. 2010-154156), the contents thereof being incorporated herein by reference.

INDUSTRIAL APPLICABILITY

The fumaric acid diester based resin for retardation film according to the present invention is a fumaric acid diester based resin suitable for a retardation film, which has excellent optical characteristics, including a high out-of-plane retardation even in a thin film, a large refractive index in the thickness direction of a film, small wavelength dependency, and the like, and in particular, it is suitable for a retardation film for liquid crystal display element. Therefore, an industrial value of the present invention is conspicuous.

EXPLANATIONS OF LETTERS OR NUMERALS nx represents a refractive index in the fast axis direction within the film plane.
ny represents a refractive index in the film in-plane direction orthogonal to nx.
nz represents a refractive index in the thickness direction of the film.

The invention claimed is:
1. A retardation film comprising:
a fumaric acid diester based resin which comprises:
   from 60 to 70% by mole of a diisopropyl fumarate residue unit; and
   from 30 to 40% by mole of a fumaric acid diester residue unit having an alkyl group having a carbon number of 1 or 2,
the retardation film having a thickness of from 10 to 50 μm,
wherein refractive indices of the retardation film satisfy formula: nx≤ny<nz, where nx is a refractive index in a fast axis direction within a film plane of the retardation film, ny is a refractive index in a film in-plane direction orthogonal thereto, and nz is a refractive index in a thickness direction of the retardation film; and
wherein an out-of-plane retardation per unit thickness of the retardation film is 4.5 nm/film thickness (μm) or more in terms of an absolute value, where the out-of-plane retardation per unit thickness is a value of an out-of-plane retardation (nm) divided by the thickness of the retardation film (μm), and the out-of-plane retardation (Rth) is measured at a wavelength of 550 nm and represented by formula (a):

$$Rth=((nx+ny)/2-nz)\times d \qquad (a)$$

wherein d represents a thickness of the retardation film (nm).

2. The retardation film as claimed in claim 1, wherein the out-of-plane retardation is from −50 to −2,000 nm.

3. The retardation film as claimed in claim 1 or 2, wherein a ratio (R450/R550) between a retardation of the retardation film measured at a wavelength of 450 nm (R450) to a retardation of the retardation film measured at a wavelength of 550 nm (R550) is not more than 1.1.

4. The retardation film as claimed in claim 1, wherein the out-of-plane retardation is from −100 to −500 nm.

5. The retardation film as claimed in claim 1, wherein a ratio (R450/R550) between a retardation of the retardation film measured at a wavelength of 450 nm (R450) to a retardation of the retardation film measured at a wavelength of 550 nm (R550) is not more than 1.05.

6. The retardation film as claimed in claim 1, wherein the retardation film has a light transmittance of 85% or more.

7. The retardation film as claimed in claim 1, wherein the retardation film has a light transmittance of 90% or more.

8. The retardation film as claimed in claim 1, wherein the retardation film has a haze of not more than 2%.

9. The retardation film as claimed in claim 1, wherein the retardation film has a haze of not more than 1%.

10. The retardation film as claimed in claim 1, further comprising an antioxidant.

11. The retardation film as claimed in claim 1, further comprising an ultraviolet ray absorber.

* * * * *